United States Patent [19]

Tomita

[11] 4,427,387
[45] Jan. 24, 1984

[54] DRAWING TOY

[75] Inventor: Tohru Tomita, Tokyo, Japan

[73] Assignee: Takara Co., Ltd., Tokyo, Japan

[21] Appl. No.: 413,468

[22] Filed: Aug. 31, 1982

[30] Foreign Application Priority Data

Sep. 17, 1981 [JP] Japan .................... 56-137872[U]

[51] Int. Cl.³ .................... G09F 11/18; G09B 11/06
[52] U.S. Cl. .................... 434/88; 40/525; 434/426
[58] Field of Search .................... 434/84, 85, 86, 87, 434/88, 89, 90, 91, 92, 96, 97, 107, 404, 405, 426; 40/118, 525

[56] References Cited

U.S. PATENT DOCUMENTS

| | | | |
|---|---|---|---|
| 198,589 | 12/1877 | Fabronius | 434/96 X |
| 1,559,665 | 11/1925 | Beery | 40/518 X |
| 1,992,028 | 2/1935 | Harper | 40/525 X |
| 2,257,005 | 9/1941 | Grosse | 434/88 X |
| 3,889,397 | 6/1975 | Flood | 434/88 |
| 4,258,491 | 3/1981 | Ernst | 40/525 |
| 4,326,351 | 4/1982 | Heywood | 40/525 X |

FOREIGN PATENT DOCUMENTS 2651063 5/1978 Fed. Rep. of Germany ........ 40/118

OTHER PUBLICATIONS

Fashion Plates, p. 24 of 1979 Tomy Corporation Catalog.

Primary Examiner—Harland S. Skogquist
Attorney, Agent, or Firm—Jackson, Jones & Price

[57] ABSTRACT

Disclosed is a drawing toy which includes a plurality of light transmitting carriers that are manually movable past a writing platen which supports portions of the carrier. Each carrier has on its surface a series of different figure fragments which inhibit light from passing through the carrier where a figure fragment is displayed. Selectively moving the carriers to the platen positions different figure fragments over the platen. There is a light source adjacent to the platen and on the side of the platen opposite the carrier so that light passes through the platen and then through the carrier. Preferably, a transparent protective member overlies the portion of the carriers supported by the platen, with the carriers being sandwiched between this member and the platen. A translucent sheet of paper is placed over the protective member opposite the platen. This paper, being sufficiently light transmitting, permits the viewer to see the fragments displayed on the carrier through the paper, enabling the viewer to trace an image of the figure fragments on to the paper.

1 Claim, 6 Drawing Figures

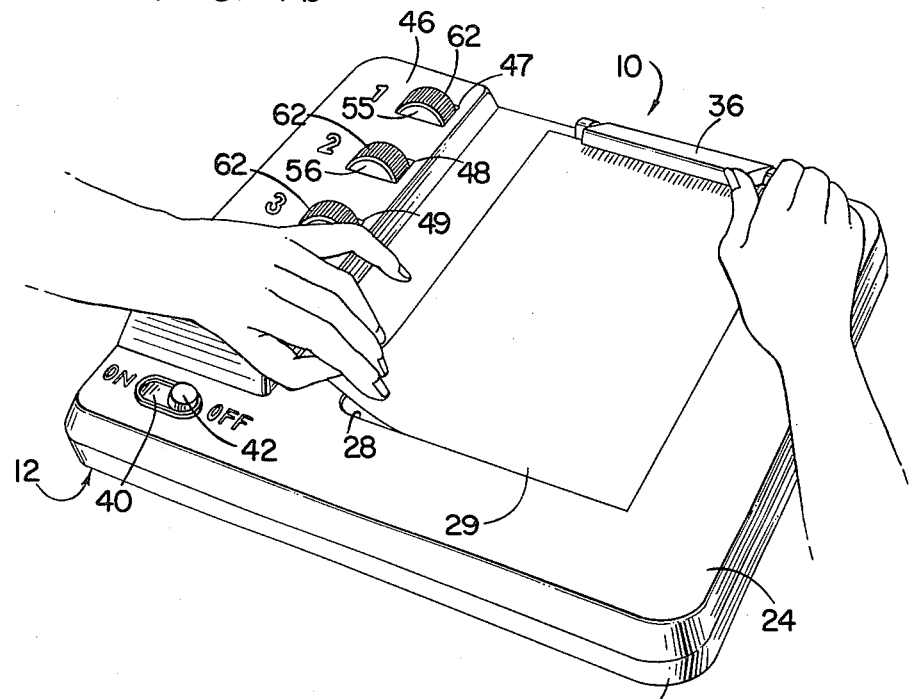
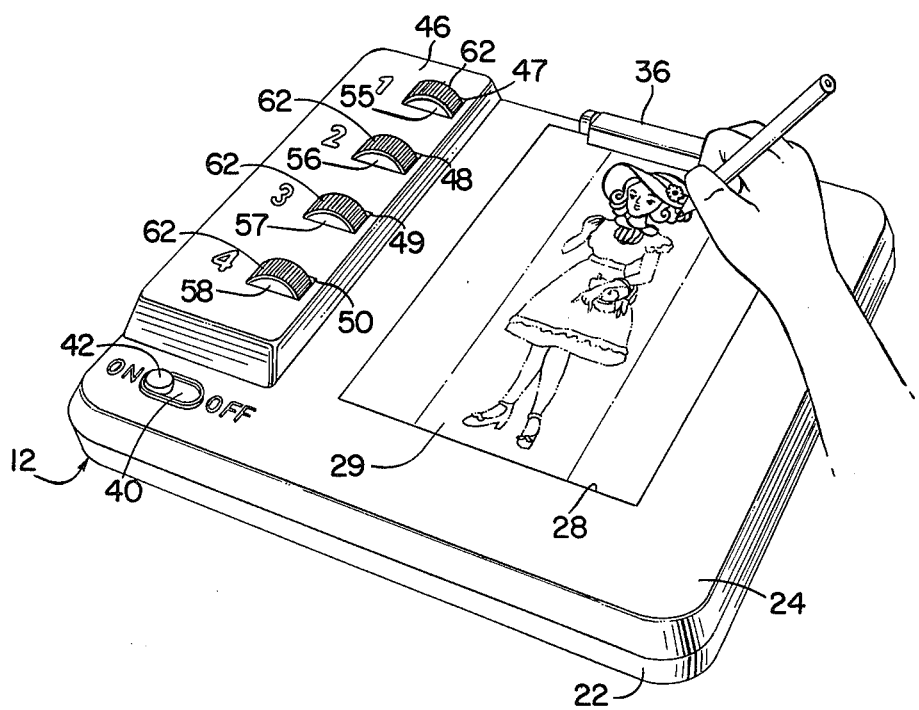

DRAWING TOY

RELATED APPLICATIONS

This application is a counterpart of Japanese Utility Model Application No. 137872/1981, filed Sept. 17, 1981, entitled "Illustration Exercising Device," and incorporated herein by reference.

BACKGROUND OF THE INVENTION

1. Field of the Invention

This invention relates to toys, and in particular relates to toys which assist children in drawing figures such as humans clothed in different attire.

2. Background Discussion

Most children enjoy drawing, but if they do not have a natural talent for art, may tend to shy away from this activity. It is the object of this invention to provide a toy which will assist children in drawing, for example, drawing the human figure. One of the principal advantages of this toy is that the form of the human figure may be changed and clothed in different attire, providing variety which will hold the child's interest. This change is accomplished very quickly by simply rotating a dial or wheel. Another advantage is that it provides a simple way for the child to trace the human figure and thereby gain confidence in his ability to draw.

BRIEF DESCRIPTION OF THE INVENTION

Broadly, the toy of this invention includes a housing for a plurality of light transmitting carriers having figure fragments on the surface of the carriers. When aligned properly, these carriers display in a window in the housing a human figure. The carriers are moved to a drawing platen at the window and the child places a sheet of writing material over the platen and carriers and traces the outline of the human figure appearing in the window. Light shines through the platen, carrier, and writing material, enabling the child to clearly see the outline of the figure displayed in the window by the carriers. Endless belts, each having a series of the same part of the human form printed on the surface, are the preferred carriers. For example, one belt would have printed thereon a series of heads, each head having a different facial appearance, hairdo, headwear, etc. Another belt would have printed thereon a series of torsos, each torso having a different posture, clothing, etc. The belts are parallel, adjacent each other, and manually movable. Thus, the child can assemble at the platen the form of a human and then change both the form and the attire at will by moving one or more of the belts to advance different figure fragments to the platen.

In accordance with an important feature of this invention, the platen covers the light source and supports the carrier. For example, the upper flights of the belts are supported by the platen. A transparent protective member is in the window and the upper flights of the belt are sandwiched between this member and the platen. The belts are held by the protective member snug against the platen so that the writing material may be placed over the carrier and rest against the flat platen, with the member serving as a shield for the belts. Thus, when the child draws on the writing material with, for example, a pencil, the belts are not damaged. The platen is rigid so that it supports the belts and writing material as the child presses downwardly against the platen to trace the figure appearing on the surfaces of the aligned belts.

BRIEF DESCRIPTION OF THE DRAWING

FIGS. 4a, 4b and 4c are perspective views showing the steps employed by a child in using this toy.

DESCRIPTION OF THE PREFERRED EMBODIMENT

Figure 1:
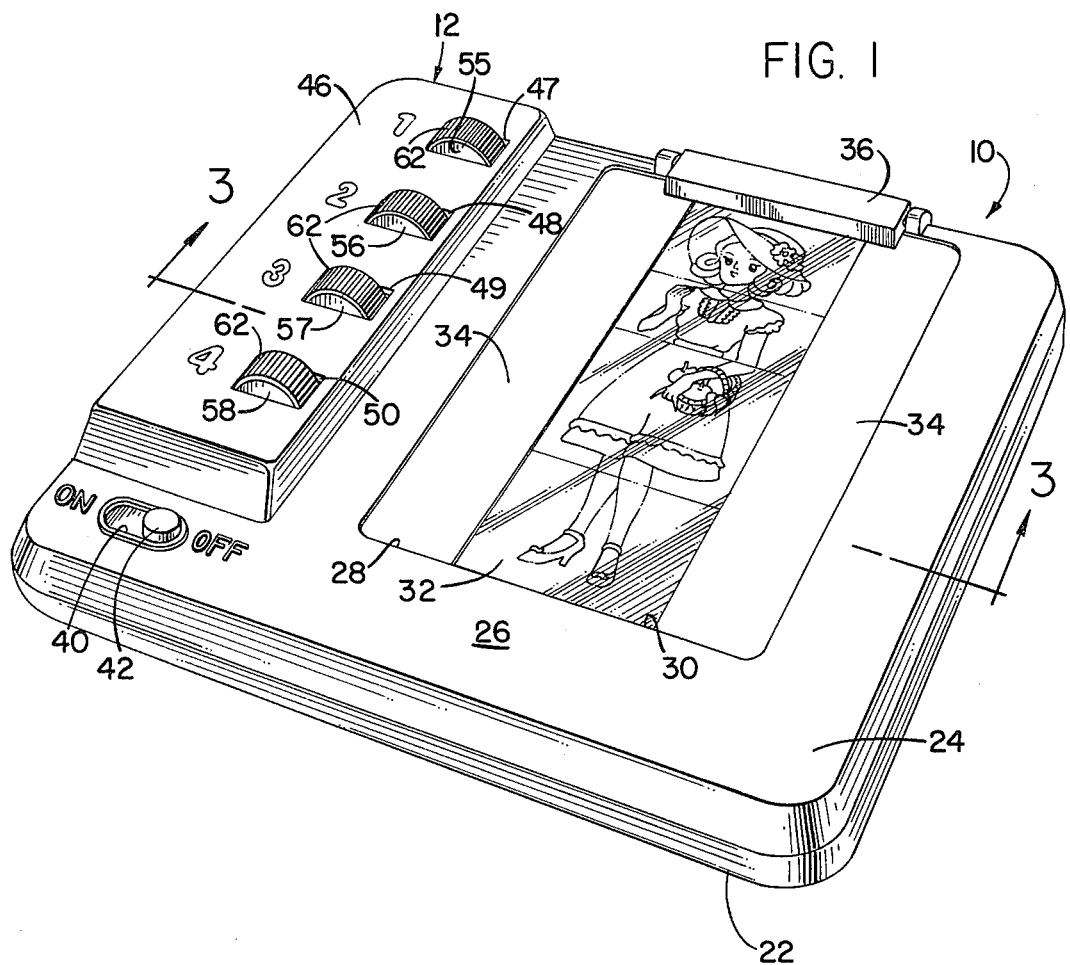
FIG. 1 is a perspective view of the toy of this invention.
Figure 3:
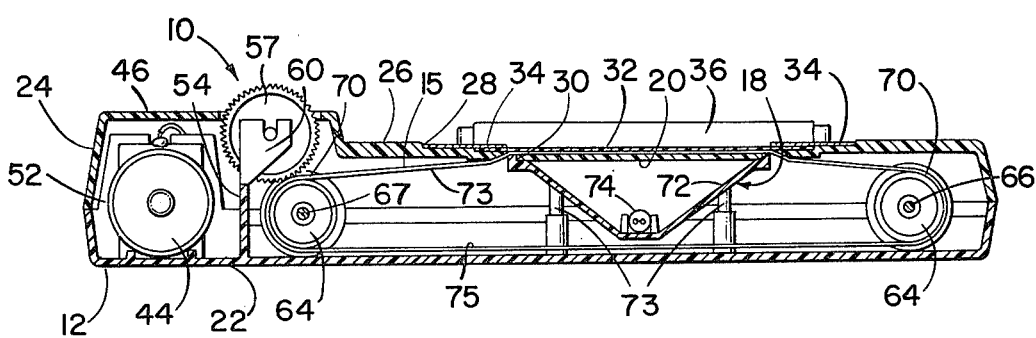
FIG. 3 is a cross-sectional view taken along line 3—3 of FIG. 1.
Figure 2:
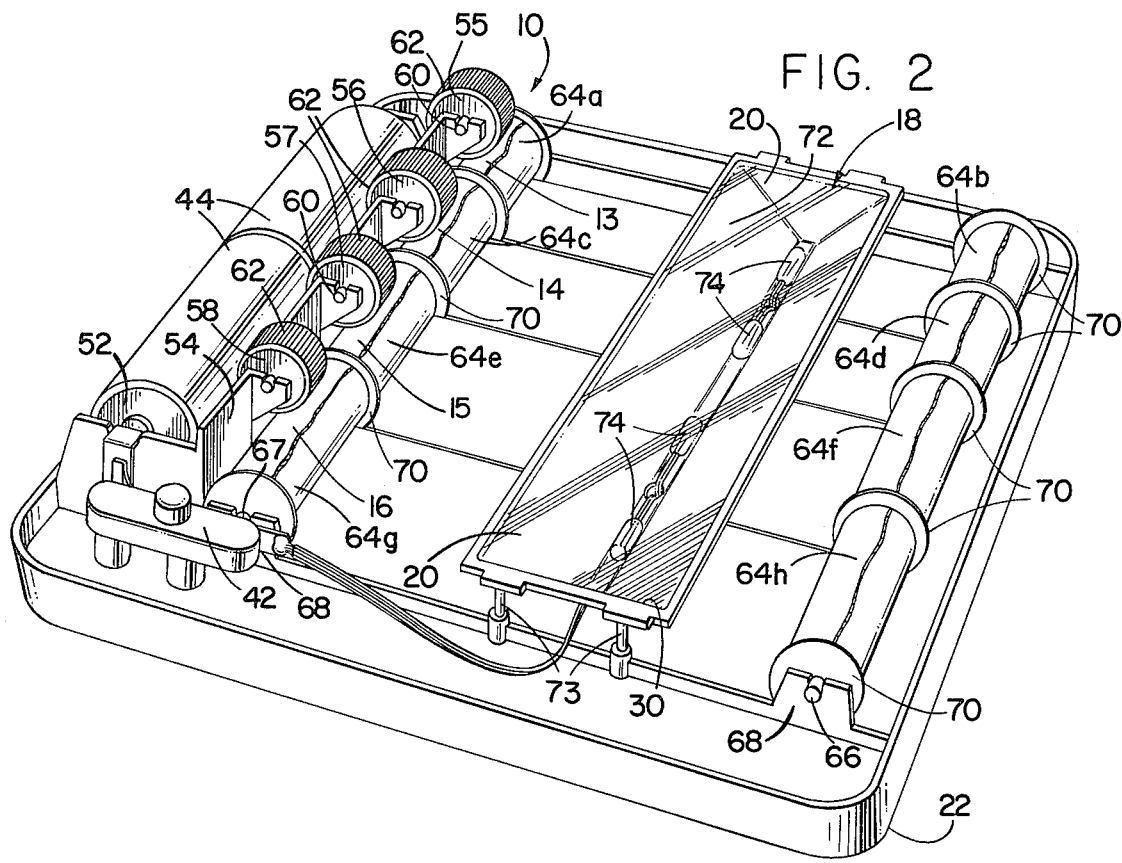
FIG. 2 is a perspective view, with sections broken away, of the toy of this invention, with the upper section of the housing removed to show the internal construction of the toy.

As shown in FIGS. 1 through 3, the toy 10 of this invention has the following principal components: a housing 12, four endless belts 13, 14, 15 and 16, a light 18, and a platen 20.

The housing 12 has two main sections: a lower section and an upper section, with these sections being joined together by screws (not shown). The upper section has along its left side a raised unit 46 having a series of four small rectangular openings 47, 48, 49, 50 in the flat roof of this unit, preferably numbered as indicated, and a generally flat portion 26 in which is located a rectangular recess 28. This recess preferably is about equal to or wider than the width of the sheet of writing material, for example, paper 29 (FIG. 4b), used with the toy. Centered within this recess 28 is a rectangular opening or window 30. A transparent flat piece of tough plastic sheet 32 (FIG. 3) covers this window 30, with the edges of the sheet overlapping the sides of the window. Adhesive strips 34 are used to tape the edges of the sheet 32 to the marginal portions of the recess 28.

At the edge of the flat portion 26 adjacent the top of the window 30 is a spring biased clip 36 which, as illustrated in FIG. 4b, is used to releasably hold the paper 29 over the window 30. The paper 29, which is semi-transparent, thus allows light to pass through it. When the paper 29 is placed on the upper section, the recess 28 serves as a guide or frame to facilitate alignment of the paper with the window 30. As shown in FIGS. 4b and 4c, the child will position the paper 29 in the recess and the window 30 will be opposite the central part of the paper.

In the corner of the flat portion 26 is an opening 40 through which a manually operable switch 42 protrudes. The light 18, which is enclosed within the housing 12, is turned on by moving the switch 42 to the left as shown in FIG. 1 to close a circuit including batteries 44 and the light 18. Thus, when the child moves the switch 42 to the ON position, the light 18 is energized.

Referring to FIGS. 2 and 3, the lower section 22 of the housing 12 includes a battery compartment 52 having an elevated wall 54 which projects upwardly into the raised unit 46 of the upper section 24 of the housing. A series of spaced wheels 55, 56, 57, 58, each having their respective axles carried in pairs of brackets 60 protruding from this wall, are aligned with the rectangular openings in the raised unit. A circumferential segment of each of these wheels protrudes from its corresponding rectangular opening, and each wheel carries a serrated tire 62 about its circumference. These tires 62 are simply flexible bands made of an elastomeric material, such as rubber. The tire is stretched outwardly to allow the wheel body to be inserted into the opened tire, which, upon release, then contracts to grasp firmly the wheel body.

Each belt has an upper flight 73 and a lower flight 75 (FIG. 3). The upper flights 73 of the belts just opposite the wheels are disposed beneath the serrated tires 62 and engage these tires. The serrated tires 62, being in frictional contact with the external surface of the belts, enable the child to move each belt independently. When the child pushes against a serrated tire in either direction, the wheel bearing this tire rotates, forcing the belt to advance its upper flight past the window 30.

The belts are mounted to move through a cyclical path, and are carried by a series of rollers 64a through 64h which are mounted on shafts 66 and 67 disposed between brackets 68 that are integral with and project upwardly from the floor of the lower section 22 of the housing. These belts are stretched between opposed pairs of rollers, with each roller in a pair having a width equal to the width of the belt borne by the roller pairs. For example, belt 13 and rollers 64a and 64b have widths of approximately 1¾ inches. Belt 14 and rollers 64c and 64d have widths of approximately 2½ inches. Belt 15 and rollers 64e and 64f have a width of approximately 1 inch. And belt 16 and rollers 64g and 64hh have a width of approximately 1½ inches. Discs 70 are mounted on the shafts 66 and 67 between adjacent rollers and between the brackets 64 and the end rollers 64a, 64b, 64g, and 64h. These discs 70 serve as tracks for the belts. The belts are all of equal length, each flight being approximately 7.25 inches. These belts are aligned in a row so that they move along parallel and adjacent paths.

The belts carry figure fragments, and when aligned properly, display the form of a human in the window 30. Each belt is made of a relatively thin sheet of plastic which is pigmented white to provide a white background for the figure fragments. The figure fragments are printed on the external surface of the belts, and each fragment is outlined, preferably in black ink, to highlight the form. Preferably the human forms displayed by the belt are attired in different multicolored costumes. For example, belt 13 would carry seven different heads with different facial features, hairdos, and hairpieces. Belt 14 would carry seven different upper torso sections, attired again in different multicolored blouses and having different postures so that the arms are placed in different positions. Belt 15 would carry seven different lower torso sections from approximately the waist to the knee. Again, different dresses or pants and leg and arm positions would be displayed. The last belt 16 would carry seven different leg sections from approximately the knee to the foot, with each figure fragment attired in stockings and shoes which are distinct from that of the other figure fragments carried on belt 16. This variety of human forms in colorful attire will permit the child to alter the form displayed in the window 30 to create different types of human forms each wearing different attire. This is quickly and easily accomplished by manipulating the wheels to advance one or more of the belts past the window 30. This allows the child to amuse him or herself by exercising his or her imagination, thus holding the interest of the child.

The belt portions in the window 30 are illuminated by the light 18 which is a reflector 72, supported at its corners by posts 73 and having a V-shaped cross-section, with a series of light bulbs 74 disposed at the bight in the reflector. The platen 20 covers the open mouth of the reflector 72 and is secured to the edge of the reflector, for example, by gluing it along this edge. Thus the upper flights 73 of the belts move over the surface of the platen 20, being supported by this platen and sandwiched between the platen and the flexible sheet 32.

OPERATION

Figure 4A:
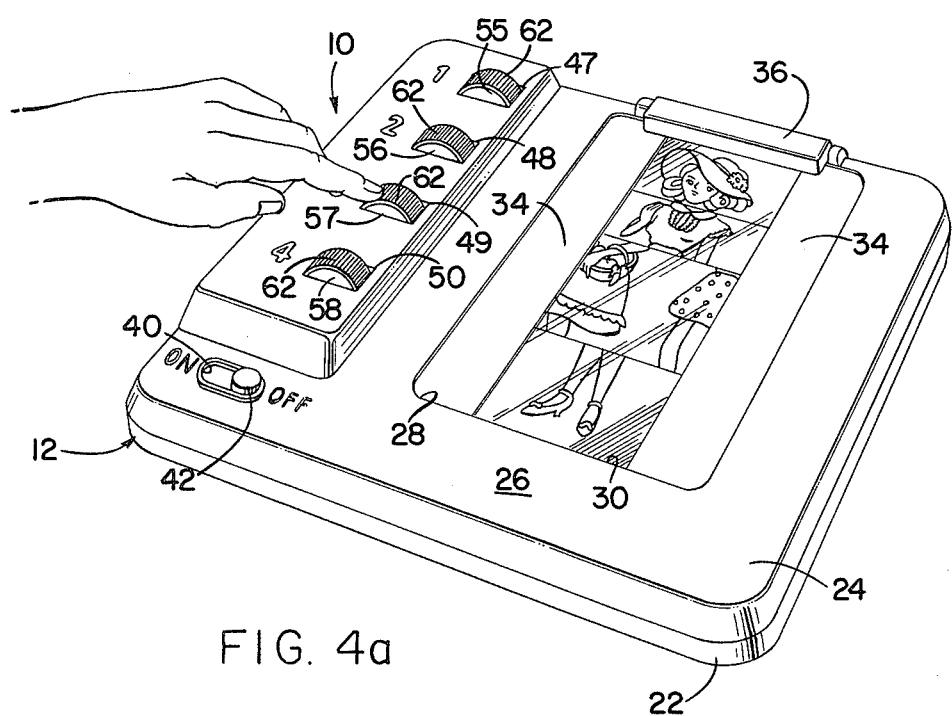

To use this toy 10, the child simply manipulates the wheels 55 through 58 by pushing against their serrated tires 62. As illustrated in FIG. 4a, the child is rotating wheel 57. This will move the belt 15 to advance its upper flight 73 over the platen 20, removing one figure fragment from the window 30 and bringing another figure fragment into the window 30. The other belts 13, 14 and 16 remain stationary unless the child moves them. The child can thus change a portion of the figure displayed in the window 30 to create unique forms. For example, the child may wish to draw three or four similar human forms, the only difference being that they each will be wearing a different skirt. On the other hand, the figures may be such that there is a preferred combination of figure fragments. The child will realize this and may draw the preferred combinations, as well as combinations of his or her own unique design.

When the child has manipulated one or more of the wheels 55 through 58 to display in the window 30 the human form which he or she wishes to draw, then, as shown in FIG. 4b, the child lifts up the clip 36 and inserts the leading edge of the paper 29 into the open clip, positioning the paper over the window 30. The clip, upon release, holds the paper 29 in position so that it does not move to any significant degree as the child draws upon it, as shown in FIG. 4c. Since the transparent protective member 32 is disposed between the paper and the belt portions in the window 30, when the child begins to draw on the paper 38, the belts are protected by this member.

Before drawing the form displayed in the window, the child turns on the light 18 by pushing the switch 42 to the left, as shown in FIG. 1. Light then illuminates the back sides of the belt portions in the window 30, passing through the white background and being absorbed by the black printing outlining of the human form. Consequently, the child sees the outline of the human form through the paper 38, allowing the child to trace this outline on the sheet of paper 38.

The above description presents the best mode contemplated for carrying out the present invention. This invention is, however, susceptible to modifications and alternate constructions from the embodiment shown in the drawing and described above. It is not the intention to limit this invention to the particular embodiment disclosed; but on the contrary, the invention is to cover all modifications, equivalencies, and alternative constructions falling within the spirit and scope of the invention as expressed in the appended claims.

What is claimed is:
1. A toy comprising:
   a generally boxlike housing having a generally flat upper surface portion including a window and adjacent this upper surface portion a raised section including wheel means rotatably mounted within the raised section, said wheel means having at least a portion extending from the raised section which may be manually manipulated to rotate the wheel means, said wheel means having serrated surfaces made of an elastomeric material;

a plurality of endless belts, each having light transmitting and light blocking segments which form on the surface of each belt a series of figure fragments, each of said belts being adapted to move along separate paths to advance sequentially the different figure fragments displayed on the surface of the belts to the window, said belts being mounted within the housing on spaced roller means disposed beneath and on opposite sides of the window and adapted to rotate freely to move the belt carried by the roller means along separate parallel paths so that each belt moves along a lower flight and an upper flight, each of said belts engaging one of said wheel means so that the serrated surface of the wheel means is in frictional contact with the surface of the belt;

a light source in the housing beneath the window and between the upper and lower flights of the belts;

a generally flat, transparent platen beneath the upper flight of the belt and above the light source for supporting the upper flight of the belt and a sheet of semi-transparent writing material resting on the flat upper surface portion of the housing and over the window;

a transparent protective member at the window, with the upper flight of the belt at the window being sandwiched between said protective member and the platen; and means adjacent the window for releasably holding the writing material at the window.

* * * * *